G. W. WEBB.
MEANS FOR CONNECTING THE ENDS OF BELTS.
APPLICATION FILED SEPT. 17, 1917.
1,306,507.
Patented June 10, 1919.
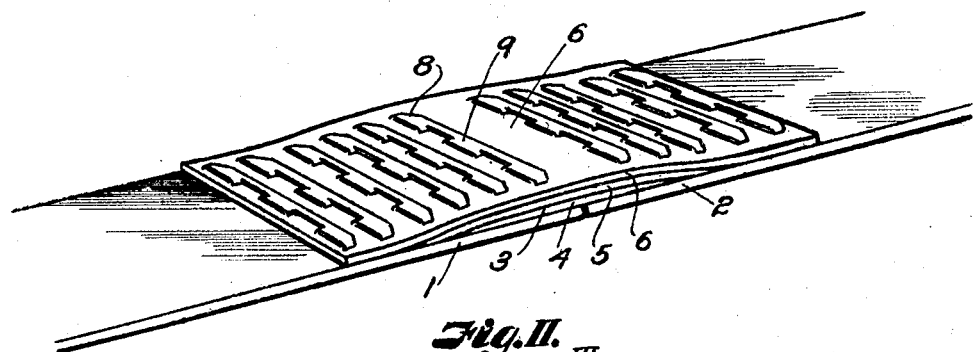
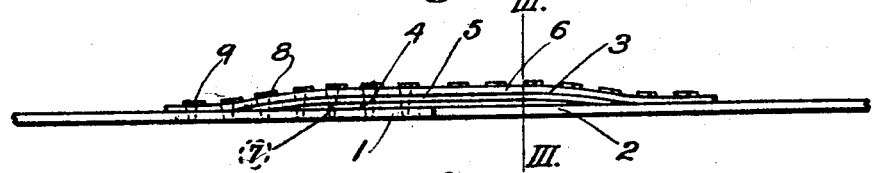
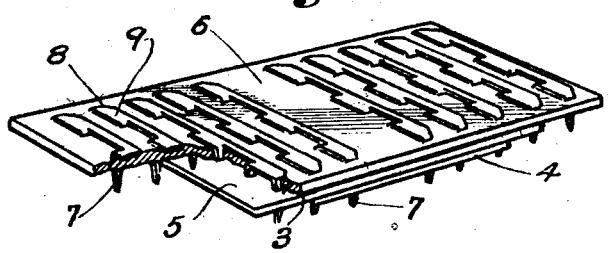
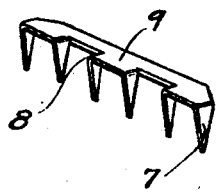
INVENTOR.
George W. Webb.
BY *Arthur C. Brown*
ATTORNEY

UNITED STATES PATENT OFFICE.

GEORGE W. WEBB, OF JOHNSON, KANSAS, ASSIGNOR, BY MESNE ASSIGNMENTS, OF TWELVE AND ONE-HALF ONE-HUNDREDTHS TO J. C. CONN, OF BOONTON, NEW JERSEY, AND THIRTY-NINE AND ONE-HALF ONE-HUNDREDTHS TO JAMES A. WEBB, OF JOHNSON COUNTY, KANSAS.

MEANS FOR CONNECTING THE ENDS OF BELTS.

1,306,507. Specification of Letters Patent. Patented June 10, 1919.

Application filed September 17, 1917. Serial No. 191,733.

*To all whom it may concern:*

Be it known that I, GEORGE W. WEBB, a citizen of the United States, residing in the county of Johnson and State of Kansas, have invented certain new and useful Improvements in Means for Connecting the Ends of Belts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to means for connecting the ends of belts and has for its principal object to provide means whereby the ends of a belt may be easily and securely connected.

It is also an object of the invention to provide means for so connecting the ends of the belt that the ends thereof will lie in the same or substantially the same plane and thereby obviate offset at the joint.

In accomplishing these objects I have provided improved details of structure hereinafter described and illustrated in the accompanying drawings, wherein:—

Figure I is a perspective view of the ends of a belt, illustrating their connection by my improved means; the strips of the fastening means and members of the belt being exaggerated for better illustration.

Fig. II is an edge view of the same.

Fig. III is a cross section on the line III—III, Fig. II.

Fig. IV is a perspective view of a connecting member.

Fig. V is a detail perspective view of one of the fastening devices comprised in the connecting member.

Referring more in detail to the drawings:

1—2 designate ends of a belt or section of a belt which require connection to form a band, and 3 a strip of material, preferably of ply canvas, of substantially the same width as the belt and of a length to extend on each side of the belt joint. The several plies of the strip are preferably unequal in length and arranged as shown in Figs. I and II, *i. e.*, when the strip comprises three plies, the shortest ply 4 is at the inner side, the center ply 5 on the first, with its end extending therebeyond, and the third, or outer ply 6 on the outer two with its ends extending beyond the ends of center ply 5.

Extending through the strip are teeth 7 of fastening devices 8, preferably comprising flat heads 9 formed of sheet metal and having the teeth 7 struck therefrom to project from one edge of the head; the teeth being triangular to comprise pointed ends that may be projected through the strip 3 and the belt 1—2.

By stamping the teeth as shown, the interior teeth may be formed in pairs and bent in opposite directions to give the fastenings the appearance and effect of a series of connected staples.

The strips may be made up for belts of different widths and the fastening devices applied thereto by projecting the teeth through the material so that the pointed ends project from the inner face of the strip and so that the heads lie in transverse parallel relation against the opposite or outer face of the strips, the projection of the teeth preferably being sufficient to penetrate the belt to which the strip is applied and clench on the opposite face thereof, and the heads being spaced sufficiently to allow the strip to flex freely with the belt. The fastening devices are preferably arranged in sets at opposite sides of the longitudinal center of the strip, with the sets spaced a distance greater than the spacing between individual devices, in order to make a bending line over the joint between the ends of the belt and facilitate proper application of the strips to the belt, and so as to avoid location of one of the devices directly over the joint.

It is apparent that fastening devices at the central portion of the strip project through all three plies, those at the ends through the outer ply and intermediate fasteners through the outer and central ply; the teeth being of different length if desired in order to afford uniform projection and clenched ends.

To connect the ends of a belt, a strip, carrying the fastening devices, is applied to the meeting ends of a belt, with its central, bending space bridging the joint; the teeth struck through the belt material and the exposed ends of the teeth clenched on the face of the belt opposite the strip; sufficient force being applied to cause the strip to lie flat and snugly against the belt and form a close union therewith when the teeth have been clenched. With the strip so applied the projecting ends of the central ply 5 laps inwardly over the ends of the inner ply 4 and the projecting ends of the outer ply lap inwardly over the ends of the central ply 5; fastening devices being located at the projecting portions to hold them to the belt and thereby obviate the abrupt shoulders that would be present should all of the plies terminate at the same point.

While the principal function of the flat heads of the fastening devices is that of a base for the teeth 7, they further serve as, and may be particularly constructed to provide, armor for the strip and belt ends to protect the same from the disintegrating effect of oil, which, upon contact, attacks the belt material and is especially destructive at the joint, where the fibers are exposed at the cut ends and in the perforations made by the teeth or shanks of fastening devices or splice leather.

It is apparent that with the means disclosed, the ends of the belt may be held securely in such functional relation as to avoid projections that would hammer a belt wheel; that the strip, with its fastenings, is economical because of the material employed and the facility of assembly; that application of the strip to a belt may be effected quickly and easily; that the strip may be replaced when necessary, and, that its use does not injuriously affect the belt.

While I have referred to my improvement as comprising the strip and fastening devices in a unit, it is possible, without departing from the spirit of the invention, to apply the fastening devices to the strip after the strip is laid on the belt ends although such manner of use is not as convenient as the other in either application or storage of the strip and fastening devices.

Having thus described my invention, what I claim as new therein, and desire to secure by Letters-Patent, is:—

A belt fastener comprising a flexible strip, fastening devices at each end of the strip arranged transversely thereto and having points projecting through the strip and adapted for projection through a belt to which the strip is applied, the said devices being spaced sufficiently to allow the strip to flex, and a plurality of progressively shorter strips associated with the first named strip and adapted, when the first named strip is in place, to be positioned between it and the belt.

In testimony whereof I affix my signature.

GEORGE W. WEBB.

Copies of this patent may be obtained for five cents each, by addressing the "Commissioner of Patents, Washington, D. C."